US008379983B2

(12) United States Patent
Hotta et al.

(10) Patent No.: US 8,379,983 B2
(45) Date of Patent: Feb. 19, 2013

(54) DICTIONARY CREATING APPARATUS, RECOGNIZING APPARATUS, AND RECOGNIZING METHOD

(75) Inventors: Yoshinobu Hotta, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 12/385,970

(22) Filed: Apr. 24, 2009

(65) Prior Publication Data

US 2009/0285490 A1 Nov. 19, 2009

(30) Foreign Application Priority Data

May 13, 2008 (JP) ................................. 2008-126405

(51) Int. Cl.
*G06K 9/62* (2006.01)
(52) U.S. Cl. ......... 382/185; 382/187; 382/190; 382/225
(58) Field of Classification Search .................. None
See application file for complete search history.

(56) References Cited

U.S. PATENT DOCUMENTS

| | | | | |
|---|---|---|---|---|
| 4,658,429 A | * | 4/1987 | Orita et al. ................... | 382/225 |
| 5,715,367 A | * | 2/1998 | Gillick et al. ................ | 704/254 |
| 6,345,119 B1 | * | 2/2002 | Hotta et al. .................. | 382/225 |
| 6,519,363 B1 | * | 2/2003 | Su et al. ...................... | 382/177 |
| 2008/0187174 A1 | * | 8/2008 | Metaxas et al. .............. | 382/103 |

FOREIGN PATENT DOCUMENTS

| | | |
|---|---|---|
| JP | 4-316183 | 11/1992 |
| JP | 05-046812 | 2/1993 |
| JP | 8-137997 | 5/1996 |
| JP | 11-203413 | 7/1999 |
| JP | 11-345337 | 12/1999 |
| JP | 11-345338 | 12/1999 |

OTHER PUBLICATIONS

Notice of Rejection, mailed Aug. 28, 2012, in corresponding Japanese Application No. 2008-126405 (5 pages).

* cited by examiner

*Primary Examiner* — Brian P Werner
(74) *Attorney, Agent, or Firm* — Staas & Halsey LLP (57) ABSTRACT

A dictionary creating apparatus registers probability distributions each including an average vector and a covariance matrix, in a dictionary. The dictionary creating apparatus organizes plural distribution profiles of character categories having similar feature vectors into one typical distribution profile, and registers the typical distribution profile and the character categories to be organized, associated with each other, in the dictionary, without registering eigenvalues and eigenvectors of all character categories, associated with each other, in the dictionary.

5 Claims, 7 Drawing Sheets

| CHARACTER CATEGORY | DISTRIBUTION NUMBER | AVERAGE VECTOR |
|---|---|---|
| A | 1 | $\mu_A$ |
| B | 2 | $\mu_B$ |
| C | 1 | $\mu_C$ |
| D | 3 | $\mu_D$ |
| E | 1 | $\mu_E$ |
| ⋮ | ⋮ | ⋮ |

ASSOCIATION

| DISTRIBUTION NUMBER | 1ST | | ... | NTH | |
|---|---|---|---|---|---|
| | EIGENVALUE | EIGENVECTOR | ... | EIGENVALUE | EIGENVECTOR |
| 1 | $\lambda_{a1}$ | $\psi_{a1}$ | ... | $\lambda_{an}$ | $\psi_{an}$ |
| 2 | $\lambda_{b1}$ | $\psi_{b1}$ | ... | $\lambda_{bn}$ | $\psi_{bn}$ |
| 3 | $\lambda_{c1}$ | $\psi_{c1}$ | ... | $\lambda_{cn}$ | $\psi_{cn}$ |
| ⋮ | ⋮ | ⋮ | ⋮ | ⋮ | ⋮ |

| | | \multicolumn{6}{c}{RECOGNITION RESULT} |
|---|---|---|---|---|---|---|---|
| | | A | B | C | D | E | ... |
| INPUT CHARACTER | A | | 0 | 1 | 10 | 1 | ... |
| | B | 0 | | 0 | 0 | 0 | ... |
| | C | 2 | 0 | | 0 | 0 | ... |
| | D | 8 | 0 | 0 | | 0 | ... |
| | E | 1 | 1 | 0 | 0 | | ... |
| | ⋮ | ⋮ | ⋮ | ⋮ | ⋮ | ⋮ | |

FIG.8

| PAIR 1 | PAIR 2 |
|---|---|
| A | D |
| ⋮ | ⋮ |

FIG.9

DICTIONARY CREATING APPARATUS, RECOGNIZING APPARATUS, AND RECOGNIZING METHOD

CROSS-REFERENCE TO RELATED APPLICATION

This application is based upon and claims the benefit of priority of the prior Japanese Patent Application No. 2008-126405, filed on May 13, 2008, the entire contents of which are incorporated herein by reference.

FIELD

The embodiments discussed herein are directed to a dictionary creating apparatus, a recognizing apparatus, and a recognizing method.

BACKGROUND

With the recent widespread use of camera-equipped mobile terminals (hereinafter, "camera phones"), there are growing demands for recognizing or translating characters or letters in an image taken by a camera, or retrieving information based on an input result of character recognition.

For the purpose of meeting such demands, the camera phone generally has an optical character reader (OCR) incorporated therein.

Meanwhile, it is important that a mobile terminal with the OCR should have portability. Therefore, unlike a fixed terminal such as a personal computer (PC), it is necessary to downsize a printed circuit board for a memory and a central processing unit (CPU) to downsize the mobile terminal. Accordingly, hardware performance is limited in incorporating the OCR.

Because of such limitation, a simple character recognition system is used in the OCR for the mobile terminal. Typically, in an exemplary character recognition system, an average vector of each character is stored, and a distance between a feature vector of a character inputted as a recognition target and the average vector of each character stored in a character recognition dictionary is calculated. A character that has the average vector having a smallest distance from the feature vector of the input character is then regarded as a recognition result (for example, see Japanese Laid-open Patent Publication No. 05-46812).

However, the character recognition system of Japanese Laid-open Patent Publication No. 05-46812 naturally has limited character recognition accuracy.

That is, a font of a character inputted as a recognition target is not always one of fixed types of character fonts. While character fonts previously learned can be recognized with certain accuracy, satisfactory character recognition accuracy cannot be achieved when a character font that is not learned is inputted.

It is also possible to perform character recognition using an eigenvalue and an eigenvector defined by a covariance matrix, in addition to the average vector of the character, to realize high-accuracy character recognition. In this case, a character recognition dictionary that stores therein an eigenvalue and an eigenvector of each character is required. The amount of the dictionary becomes very large, and therefore the dictionary is difficult to install in the mobile terminal.

Particularly, when the characters are Kanji (Chinese characters), the total number of characters to be registered in the dictionary is about 4,000, and thus it is impractical to register eigenvalues and eigenvectors of so many characters in the dictionary of the OCR for the mobile terminal.

For this reason, when the character recognizing apparatus is incorporated in a mobile terminal, how to reduce the amount of the dictionary while achieving a high-accuracy character recognition capability becomes an issue. This issue is widely common for cases in which pattern recognition using category probability distribution (for example, facial image recognition) is performed, as well as the cases in which the character recognition is performed as pattern recognition.

SUMMARY

According to an aspect of an embodiment, a dictionary creating apparatus includes a feature-amount calculating unit that calculates amounts of feature of each category as a recognition item, based on training data for creating a pattern recognition dictionary; a distribution-profile calculating unit that calculates a distribution profile of a group of the amounts of feature of each category based on the amounts of feature of each category calculated by the feature-amount calculating unit; a distance calculating unit that calculates a distance between the distribution profiles of respective categories based on the distribution profile of the group of the amounts of feature of each category calculated by the distribution-profile calculating unit; a clustering-target determining unit that determines the distribution profiles as clustering targets based on the distance between the distribution profiles of respective categories calculated by the distance calculating unit; a typical-distribution-profile determining unit that determines a typical distribution profile that typifies the distribution profiles of the clustering targets determined by the clustering-target determining unit; a clustering unit that clusters the distribution profiles determined as the clustering targets by the clustering-target determining unit; an associating unit that associates the typical distribution profile determined by the typical-distribution-profile determining unit with the categories that are included as elements in the typical distribution profile after the clustering performed by the clustering unit; and a dictionary registering unit that resisters the typical distribution profile and the categories associated with each other by the associating unit, in a predetermined dictionary storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of a dictionary creating apparatus, a recognizing apparatus, a recognizing method, and a recognition program according to the present invention will be explained below in detail with reference to the accompanying drawings. In the following embodiments, a case that a character recognition dictionary is created as a pattern dictionary and character recognition is performed using the created character recognition dictionary is explained.

An outline of a dictionary creating apparatus according to a first embodiment of the present invention is explained. A dictionary creating apparatus 10 (see FIG. 2) creates a character recognition dictionary for pattern recognition. Particularly, the dictionary creating apparatus 10 creates a character recognition dictionary by recognizing the fact that this dictionary is incorporated in a camera phone (a mobile terminal with a camera).

When creating a character recognition dictionary, the dictionary creating apparatus 10 according to the first embodiment performs clustering by registering only a typical distribution profile for plural character categories, feature vectors of which have similar distribution profiles, in a dictionary.

That is, it is preferable to perform the characteristic recognition using the distribution profile (the eigenvalue and the eigenvector) in addition to the average vector, to achieve a stable character recognition capability regardless of the font of the character inputted as the recognition target. However, if the eigenvalue and the eigenvector of each category are registered in the dictionary, the amount of the dictionary becomes very large, and therefore the dictionary becomes unsuitable for being incorporated in on a mobile terminal.

Accordingly, to ensure high-level character recognition accuracy, the dictionary creating apparatus 10 registers probability distribution including an average vector and a covariance matrix, in a dictionary. However, the dictionary creating apparatus 10 does not register the eigenvalues and eigenvectors of all character categories, associated with each other, in a dictionary. The character category means a category encompassed by the same character regardless of the types of the character font. The covariance matrix is a measure that indicates spread of a feature vector.

That is, the dictionary creating apparatus 10 focuses on a fact that some of many character categories are considered to have similar distribution profiles defined by a covariance matrix. The dictionary creating apparatus 10 organizes plural distribution profiles for character categories, the feature vectors of which have similar distribution profiles, into one typical distribution profile. The dictionary creating apparatus 10 then associates the typical distribution profile with the character categories to be organized, and registers the associated typical distribution profile and character categories into a dictionary.

As a result, while information of distribution profiles corresponding to the number of the character categories is registered in a dictionary in the conventional technique, only typical distribution profiles are registered in a dictionary in the first embodiment. Therefore, the absolute number of distribution profiles to be stored in the dictionary can be reduced.

Figure 1:
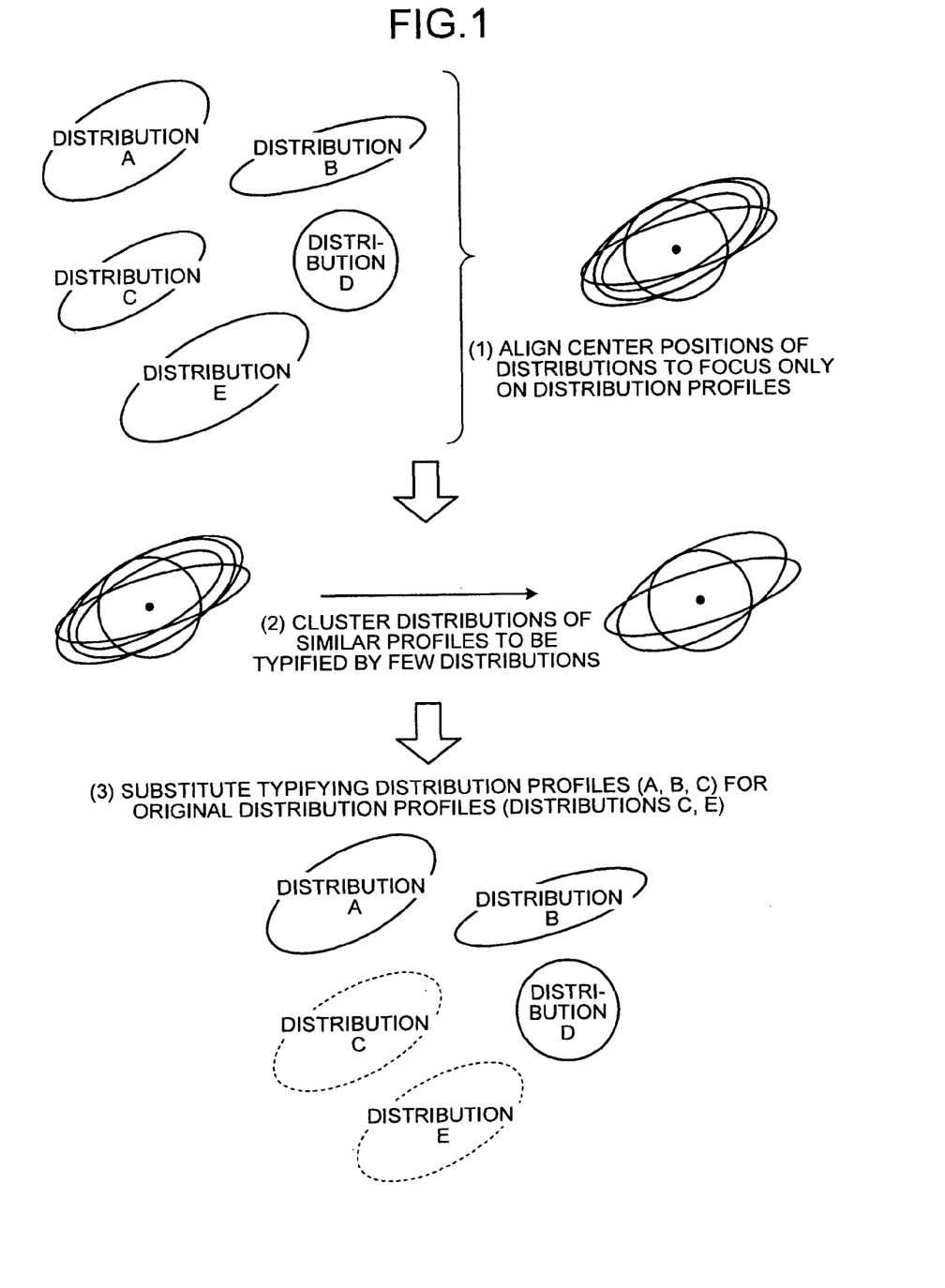
FIG. 1 is a schematic diagram for explaining a concept of clustering performed by a dictionary creating apparatus according to a first embodiment of the present invention.

This clustering is explained with reference to FIG. 1. FIG. 1 is a schematic diagram for explaining a concept of the clustering performed by the dictionary creating apparatus 10. FIG. 1 is an example in which character categories A to D have distribution profiles A to E, and the clustering is performed by regarding each of the distributions A to E as one cluster.

As depicted in FIG. 1, the dictionary creating apparatus 10 only needs to focus on the distribution profiles of the character categories A to D, and therefore the center positions of the distributions are aligned without considering average vectors thereof (see (1) in FIG. 1).

The dictionary creating apparatus 10 then calculates a distance between distributions with respect to each pair of all the clusters ($_5C_2=10$ pairs). The dictionary creating apparatus 10 integrates clusters that have a shortest distance between the distribution profiles to determine a typical distribution profile that typifies the distribution profiles of the clusters (see (2) in FIG. 1). The dictionary creating apparatus 10 substitutes the typical distribution profile for the distribution profiles of the integrated clusters (see (3) in FIG. 1).

In the example depicted in FIG. 1, distances between distribution profiles of pairs of the distributions A and C, the distributions C and E, and the distributions E and A are shorter (these pairs have higher similarities). Therefore, the clusters of the distributions A, C, and E are integrated, for example, and the distribution A is selected as a typical distribution profile of these three integrated clusters. The typical distribution profile A is then substituted for the distribution profiles of the integrated clusters including the character categories A, C, and E.

In this way, according to the first embodiment, while the distribution profiles of the feature vectors are registered in the dictionary in addition to the average vectors, only a typical distribution profile is registered in the dictionary with respect to plural character categories having similar distribution profiles of the feature vectors. Therefore, the amount of the dictionary can be reduced while the character recognition capability equivalent to that of the character recognition using the probability distribution can be achieved.

In the example depicted in FIG. 1, the two-dimensional distribution profiles are explained. However, the disclosed dictionary creating apparatus 10 does not apply only to the two-dimensional distribution profiles, and can perform the clustering also for an arbitrary number of dimensions such as three dimensions or more.

Figure 2:
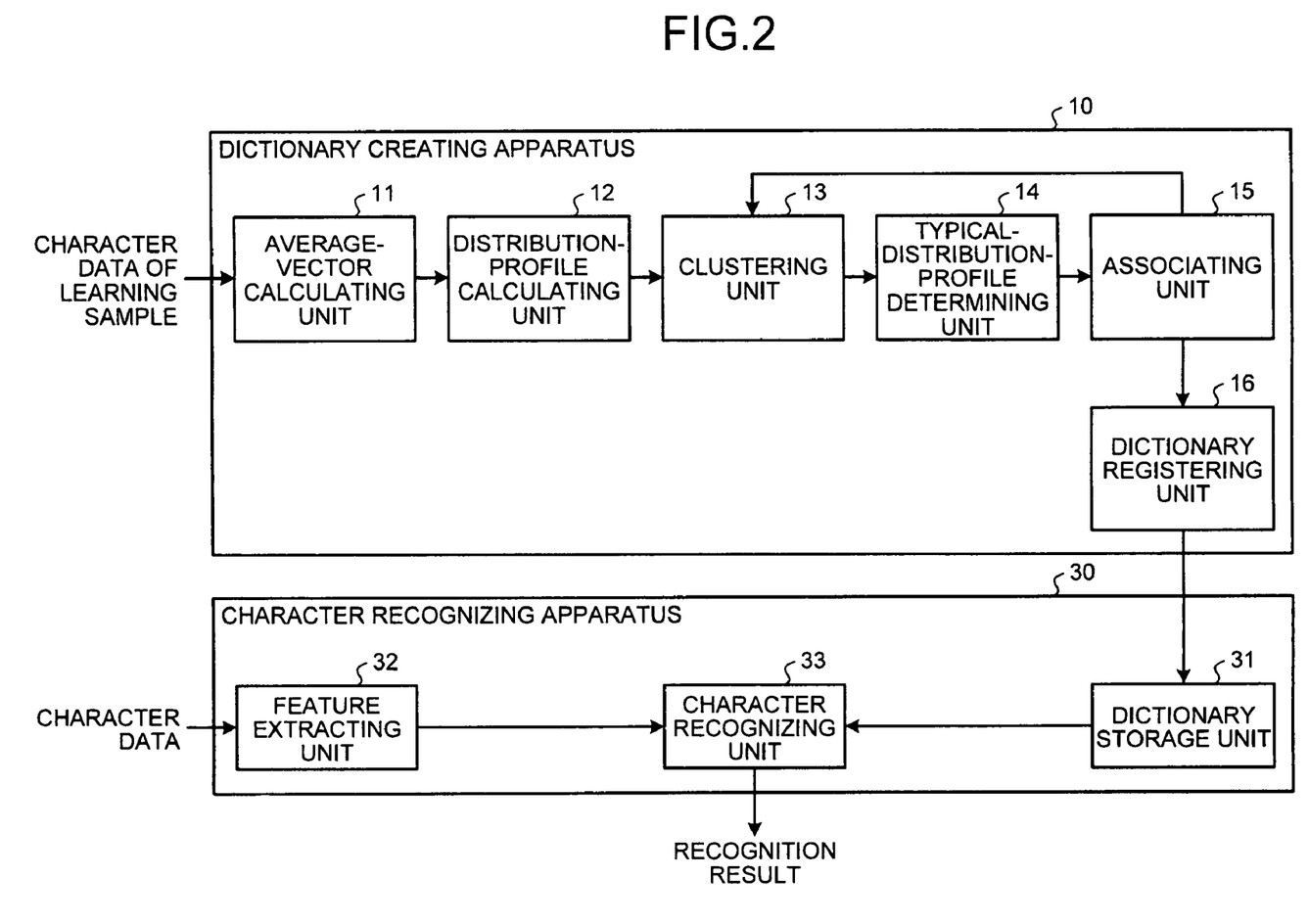
FIG. 2 is a functional block diagram of a configuration of the dictionary creating apparatus and a character recognizing apparatus according to the first embodiment.

A configuration of the dictionary creating apparatus 10 is explained. FIG. 2 is a functional block diagram of a configuration of the dictionary creating apparatus 10 and a character recognizing apparatus according to the first embodiment.

As depicted in FIG. 2, the dictionary creating apparatus 10 includes an average-vector calculating unit 11, a distribution-profile calculating unit 12, a clustering unit 13, a typical-distribution-profile determining unit 14, an associating unit 15, and a dictionary registering unit 16.

The average-vector calculating unit 11 calculates an average vector of each character category. More specifically, the average-vector calculating unit 11 calculates feature vectors of each character category based on character data of training samples inputted from a storage or an external device (not shown), and calculates an average vector of each character category from the calculated feature vectors.

The distribution-profile calculating unit 12 calculates a distribution profile of each character category. While details thereof are explained with reference to FIG. 3, the outline is as follows. The distribution-profile calculating unit 12 calculates a covariance matrix based on the feature vectors and the average vector calculated for each character category by the average-vector calculating unit 11. The distribution-profile calculating unit 12 then calculates an eigenvalue and an eigenvector based on the covariance matrix calculated for each character category. A weighted direction index histogram feature described in "Handwritten Kanji and Hiragana Recognition by Weighted Direction Index Histogram Method" (Journal D of IEICE, Vol. J70-D, No. 7, pp. 1390 to 1397, July 1987) is for example used as a feature vector of a character.

The clustering unit 13 integrates clusters (distribution profiles or typical distribution profiles). For example, regarding all distribution profiles as clusters each having one element, the clustering unit 13 calculates a distance between distribution profiles for each pair of all the clusters ($_5C_2$=10 pairs in the example depicted in FIG. 1) using a Kullback-Leibler distance as a measure of a distance between clusters. The clustering unit 13 integrates clusters having a shortest distance therebetween among the all pairs of clusters. The integration of the clusters is repeatedly performed until the number of obtained clustered converge with a value previously set based on target character recognition accuracy. Hierarchical clustering is applied for example as a method for the clustering. In the hierarchical clustering, a final number of clusters is (experimentally or empirically) defined by a user, and the clustering is performed until the number of clusters reaches the defined number.

The typical-distribution-profile determining unit 14 determines a typical distribution profile of the clusters integrated by the clustering unit 13. When the clusters of the character categories A and C are integrated in the example depicted in FIG. 1, the typical-distribution-profile determining unit 14 can select one of the distributions A and C as the typical distribution profile, or determine an average of the distributions A and C (for example, by geometrical averaging or weighted averaging) as the typical distribution profile. Preferably, the distribution selection or averaging is performed applying criteria in which a distribution of a character category having a high recognition frequency (checkup frequency) has priority.

The associating unit 15 associates the typical distribution profile determined by the typical-distribution-profile determining unit 14 with the character categories included as elements of the typical distribution profile. More specifically, the associating unit 15 links each of the character categories with a distribution number and the average vector, while linking the distribution number with the typical distribution profile (see FIG. 4). Accordingly, the associating unit 15 associates the character categories and the typical distribution profile (the eigenvalue and the eigenvector) with each other through the distribution number.

The dictionary registering unit 16 registers the average vector and the typical distribution profile of each character category, associated with each other by the associating unit 15, in a dictionary. More specifically, the dictionary registering unit 16 registers the average vector and the typical distribution profile of each character category in a dictionary storage unit 31 of a character recognizing apparatus 30, which is incorporated in a mobile terminal. The dictionary creating apparatus 10 and the character recognizing apparatus 30 can be connected through any type of network in a wired or wireless way. Further, the dictionary creating apparatus 10 and the character recognizing apparatus 30 can be incorporated in the same device.

Figure 3:
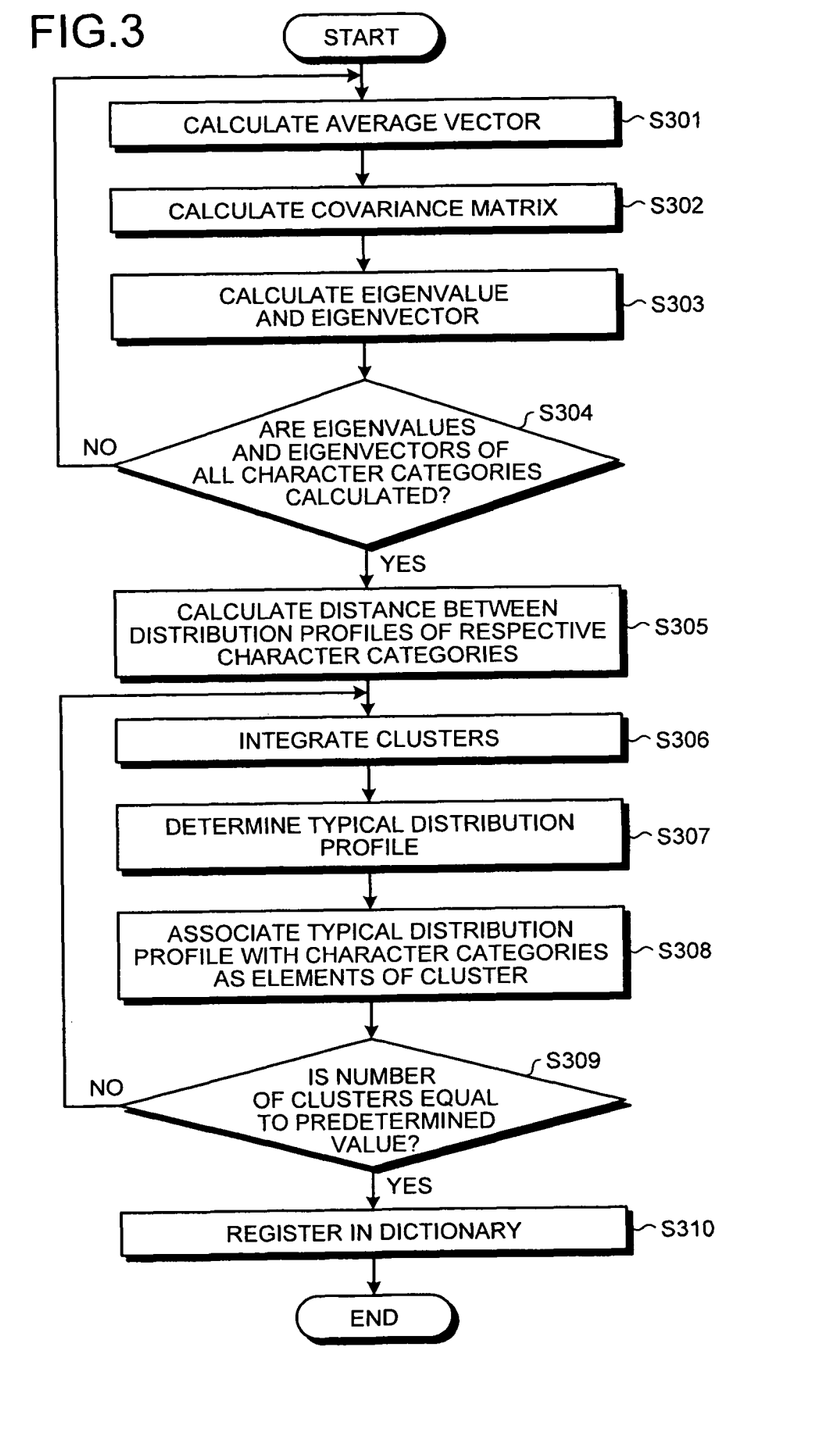
FIG. 3 is a flowchart of a dictionary-creating process procedure according to the first embodiment.

A flow of processing performed by the dictionary creating apparatus 10 is explained in detail. FIG. 3 is a flowchart of a dictionary-creating process procedure according to the first embodiment.

As depicted in FIG. 3, the average-vector calculating unit 11 calculates feature vectors of a character category based on character data of training samples inputted from a storage unit or an external device, and calculates an average vector of the character category based on the calculated feature vectors (Step S301).

The distribution-profile calculating unit 12 then calculates a covariance matrix based on the feature vectors and the average vector calculated by the average-vector calculating unit 11 (Step S302). For example, when the training data are $X_1, X_2, \ldots, X_n$, and the average vector is $\mu$, the covariance matrix is given by Formula (1).

$$\hat{\Sigma} = \frac{1}{n}\sum_{k=1}^{n}(X_K - \mu)(X_K - \mu)^T \quad (1)$$

$\hat{\Sigma}$: covariance matrix $X_1, X_2, \ldots, X_n$: learning data $\mu$: average vector The distribution-profile calculating unit 12 further calculates an eigenvalue and an eigenvector based on the covariance matrix calculated at Step S302 (Step S303).

Thereafter, when eigenvalues and eigenvectors of all character categories are calculated (YES at Step S304), the clustering unit 13 calculates a distance between the distribution profiles of respective categories with respect to all pairs of the clusters (Step S305).

For example, when the Kullback-Leibler distance is used as a measure of the distance between clusters, and when it is assumed that distributions f(x) and g(x) of two categories are both normal distributions, a distance between the two category distributions is expressed by Formula (2).

$$D_{KL} = \int \{f(x) - g(x)\}\log\frac{f(x)}{g(x)}dx \quad (2)$$

$f(x), g(x)$: category distribution

When an average of f(x) is $\mu_1$, a covariance matrix thereof is $\Sigma_1$, an average of g(x) is $\mu_2$, and a covariance matrix thereof is $\Sigma_2$, the Kullback-Leibler distance is given by Formula (3).

$$D_{KL} = \frac{1}{2}(\mu_1 - \mu_2)^T(\Sigma_1^{-1} + \Sigma_2^{-1})(\mu_1 - \mu_2) + tr\begin{bmatrix}\Sigma_1^{-1}\Sigma_2 + \\ \Sigma_2^{-1}\Sigma_1 - 2I\end{bmatrix} \quad (3)$$

$\mu_1$: average of $f(x)$ $\Sigma_1$: covariance matrix of $f(x)$ $\mu_2$: average of $g(x)$ $\Sigma_2$: covariance matrix of $g(x)$ When attention is focused only on the distribution profiles, it can be assumed that $\mu_1 = \mu_2$, and thus Formula (4) is obtained.

$$D_{KL}' = tr[\Sigma_1^{-1}\Sigma_2 + \Sigma_2^{-1}\Sigma_1 - 2I] \quad (4)$$

I: unit matrix

In this way, the distance between two category distribution profiles is expressed only with the covariance matrixes. In Formula (4), I denotes a unit matrix.

Returning to the explanation with reference to FIG. 3, upon calculation of the distances between distribution profiles, the clustering unit 13 integrates clusters having a shortest distance therebetween among all the pairs of the clusters (Step S306). The typical-distribution-profile determining unit 14 determines a typical distribution profile of the clusters integrated by the clustering unit 13 (Step S307).

The associating unit 15 associates the typical distribution profile determined by the typical-distribution-profile determining unit 14 with the character categories included as elements in the typical distribution profile (Step S308).

Figure 4:
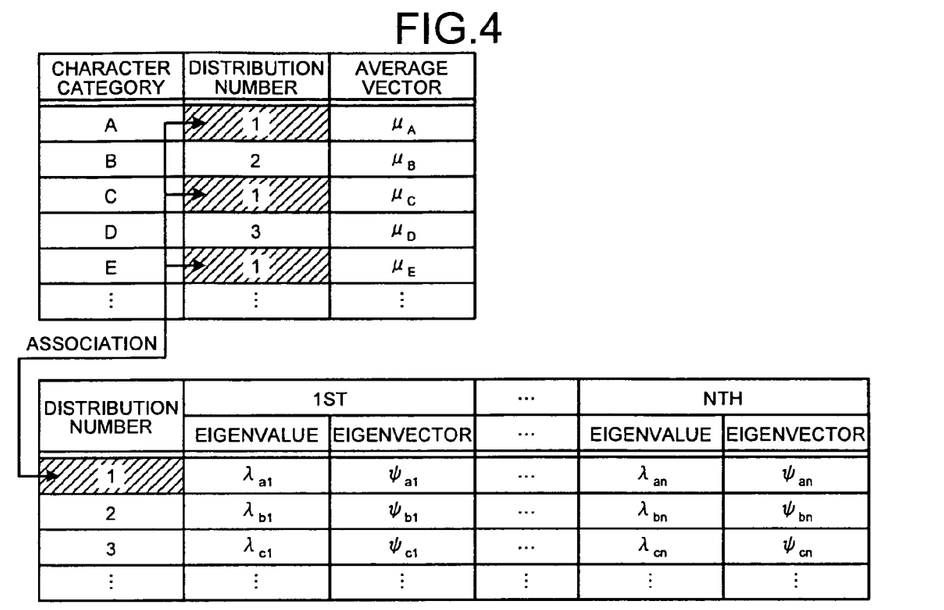
FIG. 4 is a schematic diagram for explaining a processing content of an associating unit.

For example, in an example depicted in FIG. 4, the associating unit 15 associates character categories "A", "C", and "E", and eigenvalues "$\lambda_{a1}$ to $\lambda_{an}$" and eigenvectors "$\psi_{a1}$ to $\psi_{an}$" of respective dimensions with each other using a distribution number "1".

When the number of clusters as a result of the integration by the clustering unit 13 is not equal to a predetermined value (the number of clusters that is previously set based on a target character recognition accuracy) (NO at Step S309), the processes from Steps S306 to S308 are repeatedly performed.

When the number of clusters becomes equal to the predetermined value (YES at Step S309), the dictionary registering unit 16 registers the average vector and the typical distribution profile of each character category, associated with each other by the associating unit 15, in the dictionary storage unit 31 of the character recognizing apparatus 30 (Step S310), and then the processing is terminated.

As described above, the dictionary creating apparatus 10 calculates the amounts of feature in each category as the recognition item from the training data for creating a pattern recognition dictionary. The dictionary creating apparatus 10 then calculates the distribution profile of a group of the feature amounts of each category based on the amounts of feature calculated for each category. The dictionary creating apparatus 10 then calculates a distance between the distribution profiles of the respective categories based on the distribution profile of the group of the feature amounts calculated for each category. The dictionary creating apparatus 10 then determines clustering target distribution profiles based on the distance between the distribution profiles of the respective categories, and determines a typical distribution profile that typifies the determined clustering target distribution profiles. The dictionary creating apparatus 10 then clusters the distribution profiles determined as the clustering targets, and associates the determined typical distribution profile with the clustered categories included as elements in the typical distribution profile. The dictionary creating apparatus 10 then registers the associated typical distribution profile and categories in the dictionary storage unit 31. Therefore, it is possible to reduce the amount of the dictionary while achieving a character recognition capability equivalent to that of the character recognition provided using the probability distribution.

The reduction in the amount of the dictionary is specifically explained. There are about 4,000 Japanese character categories, and each category has an average vector, eigenvalues, and eigenvectors when statistical character recognition is performed. Each category can have eigenvalues and eigenvectors as many as the number of feature dimensions at maximum. However, in many cases, about 20 eigenvalues and eigenvectors that affect the recognition rate are practically registered in the dictionary.

When a feature vector is of float type (=4 byte), an eigenvalue is of float type (=4 byte), the number of feature dimensions is 300, and the number of eigenvalues or eigenvectors is 20, the amount of a dictionary is calculated as (300 dimensions*4 byte+(4+300 dimensions*4 byte)*20)*4000 categories=101.12 megabyte.

When it is assumed that distribution profiles of 4,000 categories can be typified by 100 distribution profiles, the amount of the dictionary in this case becomes 300 dimensions*4 byte*4000+(4+300 dimensions*4 byte)*20*100=7.2 megabyte.

That is, when the dictionary creating apparatus 10 creates a dictionary under the condition above mentioned, the amount of the dictionary can be reduced to about 7% of the conventionally obtained dictionary.

The character recognizing apparatus 30 according to the first embodiment is explained. The character recognizing apparatus 30 has a character recognition dictionary that is an OCR to be incorporated in a mobile terminal and is registered by the dictionary creating apparatus 10.

As depicted in FIG. 2, the character recognizing apparatus 30 includes the dictionary storage unit 31, a feature extracting unit 32, and a character recognizing unit 33.

The dictionary storage unit 31 is a storage device, such as a nonvolatile memory, that stores therein an average vector and a typical distribution profile of each character category. For example, as depicted in FIG. 4, the dictionary storage unit 31 incorporates a table that contains a distribution number and an average vector of each character category, and a table that contains a typical distribution profile of each distribution number. The reason why the tables that contain the distribution numbers and the typical distribution profiles are separately provided is that distribution profiles of plural character categories are typified by some distribution profiles and managed by using the distribution number as a pointer, to reduce the amount of the dictionary.

The feature extracting unit 32 extracts a feature vector from input character data. The character data can be inputted through an image scanner or the like, or obtained from an external device via a network.

The character recognizing unit 33 performs character recognition based on statistical distribution. While details thereof are explained later with reference to FIG. 5, the outline is as follows. The character recognizing unit 33 calculates a distance based on the statistical distribution between the feature vector of the input character and the average vectors of character categories using the distribution profiles of the character categories stored in the dictionary storage unit 31. The character recognizing unit 33 then determines a character category having a shortest distance therebetween as a character category of the input character.

Figure 5:
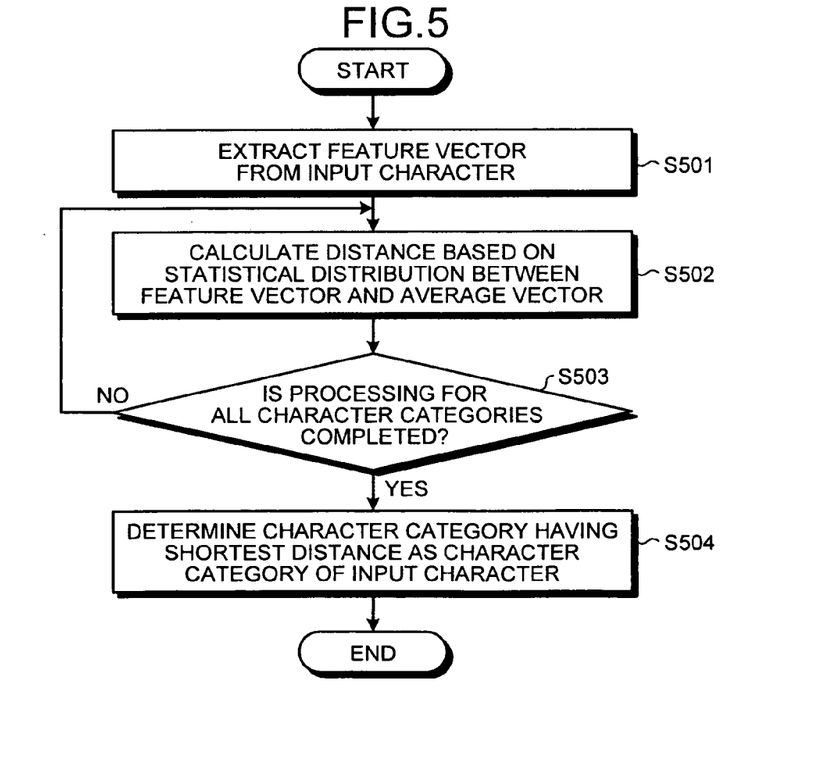
FIG. 5 is a flowchart of a character-recognizing process procedure according to the first embodiment.

A flow of processing performed by the character recognizing apparatus 30 is explained. FIG. 5 is a flowchart of a character-recognizing process procedure according to the first embodiment.

As depicted in FIG. 5, the feature extracting unit 32 extracts a feature vector of a character category from input character data inputted through an image scanner or the like (Step S501).

The character recognizing unit 33 then reads the average vector and the distribution number of the character category as a current calculation target, with referring to the dictionary storage unit 31, and calls up the typical distribution profile based on the distribution number, thereby calculating a distance based on the statistical distribution between the feature vector of the input character and the average vector of the character category (Step S502).

For example, it is assumed that a Mahalanobis distance is used as a measure of the distance based on the statistical distribution. When feature of an input character is x, an average vector of a character category is μ, and a covariance matrix thereof is $\Sigma_1$, the Mahalanobis distance is given by Formula (5).

$$d^2(x) = (x-\mu)^T \Sigma_i^{-1} (x-\mu) \quad (5)$$

x: input character feature
μ: average vector
$\Sigma_i$: covariance matrix

When the number of dimensions of the feature vector is n, a kth eigenvalue of the covariance matrix is $\lambda_k$, and an eigenvector corresponding to $\lambda_k$ is $\psi_k$, the formula (5) is expressed as Formula (6).

$$d^2(x) = \sum_{k=1}^{n} \frac{1}{\lambda_k} ((x-\mu) \cdot \varphi_k)^2 \quad (6)$$

n: number of dimensions of the feature vector
$\lambda_k$: kth eigenvalue of the covariance matrix
$\varphi_k$: eigenvector corresponding to $\lambda_k$ The Mahalanobis distance between the feature vector of the input character and the average vector of the character category is calculated according to Formula (6).

When the Mahalanobis distances of all character categories are calculated (YES at Step S503), the character recognizing unit 33 determines a character category having a shortest distance therebetween as a character category of the input character (Step S504), and then the processing is terminated.

As described above, the character recognizing apparatus 30 stores the distribution number and the typical distribution profile associated with each other, and stores the average vector and the distribution number of each character category associated with each other. The character recognizing apparatus 30 then extracts the feature vector from the input character data as a recognition target, and extracts the average vector and the distribution number corresponding to the character category as a target for distance calculation. The character recognizing apparatus 30 then extracts the typical distribution profile corresponding to the distribution number, and calculates the distance between the feature vector extracted from the input data and the average vector of the character category with respect to each character category, using the extracted typical distribution profile of the character category. The character recognizing apparatus 30 then adopts the character category having a shortest calculated distance as a recognition result. Therefore, statistical character recognition can be performed by using a pattern dictionary in which distribution profiles of plural character categories are organized into one typical distribution profile. Accordingly, it is possible to reduce the amount of the dictionary while achieving the character recognition capability equivalent to that of the character recognition performed using the probability distribution.

In the first embodiment, a case that the distribution profiles are clustered without constraints has been explained. However, for some categories, it is better not to perform the clustering regardless of the distance between the distribution profiles.

That is, in the character recognition, characters of similar letter forms such as "至" and "王" are likely to be read wrongly. When such characters of similar letter forms are to be recognized, a slight difference in the distribution profile between character categories frequently contributes to the recognition. Accordingly, when the distribution profiles of the characters of similar letter forms are clustered, the character recognition rate may be lowered.

Another dictionary creating apparatus is explained below as a second embodiment of the present invention. This dictionary creating apparatus performs the clustering of the distribution profiles after eliminating distribution profiles of characters having high reading error rates from clustering targets. This dictionary creating apparatus can register original distribution profiles of characters that are likely to be read wrongly in the dictionary, without substituting other distribution profiles by the clustering.

Figure 6:
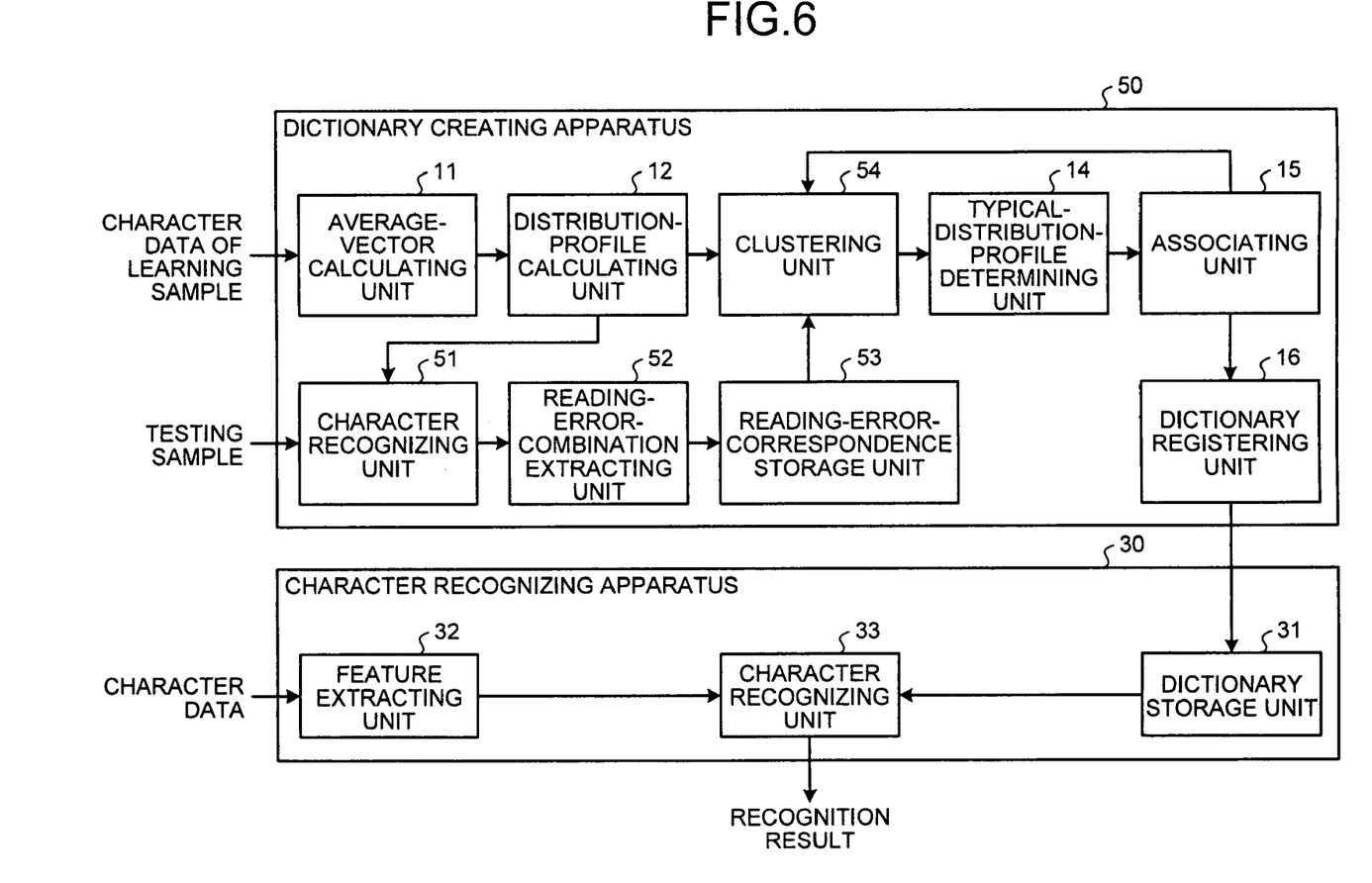
FIG. 6 is a functional block diagram of a configuration of a dictionary creating apparatus and a character recognizing apparatus according to a second embodiment of the present invention.

FIG. 6 is a functional block diagram of a configuration of a dictionary creating apparatus and a character recognizing apparatus according to the second embodiment. As depicted in FIG. 6, a dictionary creating apparatus 50 is different from the dictionary creating apparatus 10 according to the first embodiment in that a character recognizing unit 51 and a reading-error-combination extracting unit 52, and a reading-error-correspondence storage unit 53 are additionally included. Explanations of constituent elements having the same functions as those in the first embodiment will be omitted.

The character recognizing unit 51 performs character recognition based on the eigenvalue and the eigenvector of each character category calculated by the distribution-profile calculating unit 12, and character data of testing samples. For example, a subspace method is used for the character recognizing method. It is not always necessary to use the eigenvalue and the eigenvector calculated by the distribution-profile calculating unit 12. Because the dictionary that stores therein the eigenvalue and the eigenvector of each character category is well known, the character recognizing unit 51 can use such a dictionary.

Figure 7:
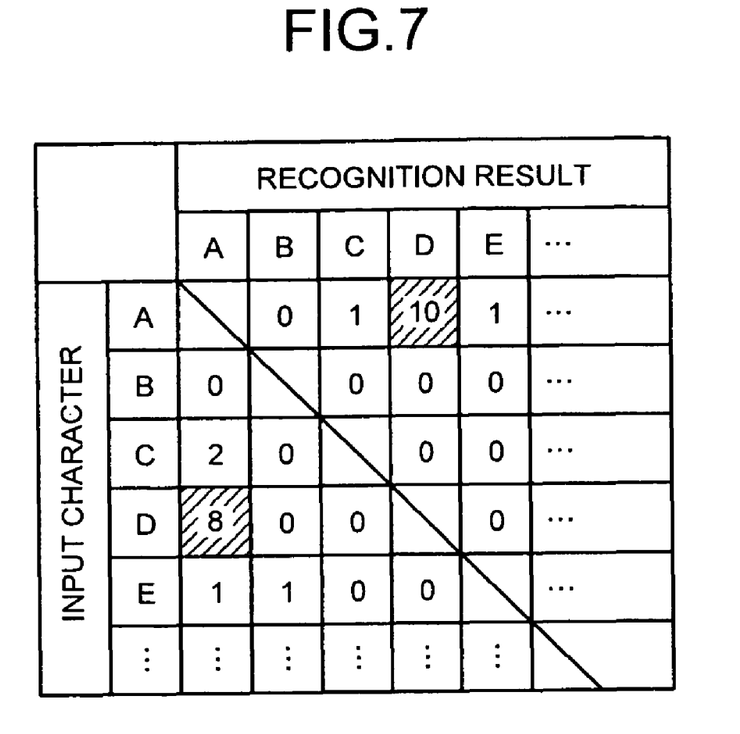
FIG. 7 is a schematic diagram for explaining character categories having a correspondence relationship with a reading error.

The reading-error-combination extracting unit 52 extracts a combination of character categories having recognition error rates higher than a threshold, from results of the recognition by the character recognizing unit 51. For example, it is assumed that characters are to be eliminated from clustering targets when the characters have been mutually recognized erroneously five times, and that the results of the recognition performed by the character recognizing unit 51 are as depicted in FIG. 7. When the character category A is inputted, it is erroneously recognized as the character category D ten times, and when the character category D is inputted, it is erroneously recognized as the character category A eight times. Accordingly, the number of times of mutual recognition error between these characters exceeds five, which is the previously determined threshold, and therefore the reading-error-combination extracting unit 52 extracts the character categories A and D as a reading error combination.

Figure 8:
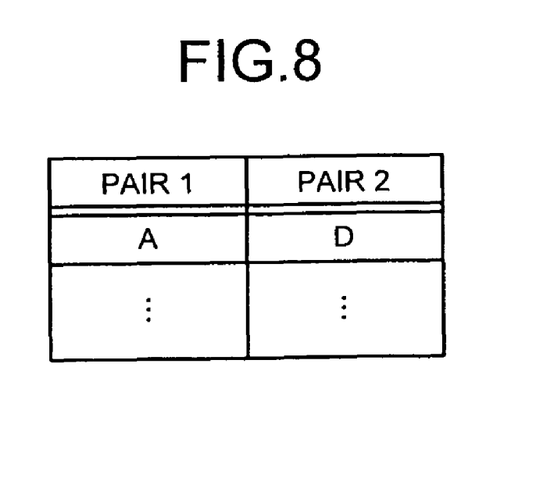
FIG. 8 is a configuration example of information stored in a reading-error-correspondence storage unit.

The reading-error-correspondence storage unit 53 is a storage device such as a nonvolatile memory that stores therein the reading error combinations extracted by the reading-error-combination extracting unit 52. For example, the reading-error-correspondence storage unit 53 stores therein pairs of character categories extracted by the reading-error-combination extracting unit 52 as the reading error combinations, as depicted in FIG. 8.

When the reading error combinations extracted by the reading-error-combination extracting unit 52 are stored in the reading-error-correspondence storage unit 53 in this way, a clustering unit 54 can eliminate clusters of character categories stored as the reading error combinations, before the clustering.

Accordingly, the dictionary creating apparatus 50 according to the second embodiment performs the character recognition based on the distribution profile of the feature vector calculated with respect to each character category and the testing sample data. The dictionary creating apparatus 50 extracts combinations of character categories mutually having recognition error rates higher than the predetermined threshold, from the recognition results. The dictionary creating apparatus 50 then eliminates the extracted combinations of character categories, thereby determining distribution profiles of the clustering targets. Therefore, it is possible to prevent the distribution profiles of characters of similar letter forms from being clustered, and reduce the possibility of recognition error. As a result, decrease in the character recognition accuracy can be suppressed.

In the first and second embodiments, a case that the character recognition dictionary is created as a pattern dictionary and the character recognition is performed using the created character recognition dictionary has been explained. However, the first and second embodiments can be similarly applied to cases in which pattern recognition (for example, facial image recognition) using probability distributions of categories is generally performed.

While the character recognizing apparatus has been explained in the first embodiment, a character recognition program having the same function can be provided by realizing the components of the character recognizing apparatus with software. A computer that executes such a character recognition program is explained in a third embodiment of the present invention.

Figure 9:
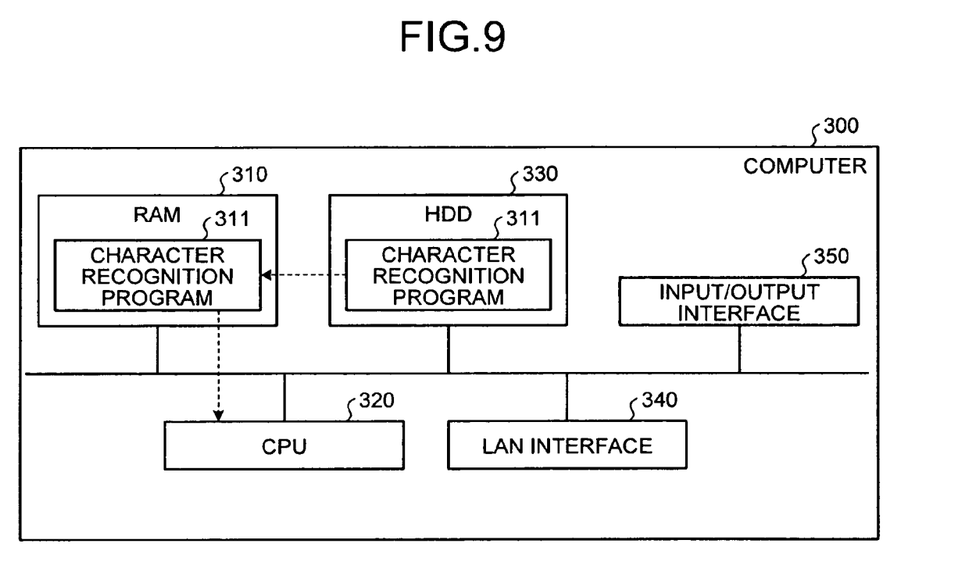
FIG. 9 is a functional block diagram of a configuration of a computer that executes a character recognition program according to a third embodiment of the present invention.

FIG. 9 is a functional block diagram of a configuration of a computer that executes a character recognition program according to the third embodiment. As depicted in FIG. 9, a computer 300 includes a RAM (random access memory) 310, a CPU 320, an HDD (hard disk drive) 330, a LAN (local area network) interface 340, and an input/output interface 350.

The RAM 310 stores therein programs, execution intermediate results of the programs and the like. The CPU 320 is a central processing unit to read a program from the RAM 310 and to execute the program. The HDD 330 stores therein programs and data. The LAN interface 340 is used for connecting the computer 300 to another computer via a wireless LAN or a LAN cable. The input/output interface 350 is used for connecting an input/output device such as a display to the computer 300.

A character recognition program 311 that is executed by the computer 300 is stored in a database of another computer system, or the like, connected through the LAN interface 340, and is read from the database to be installed in the computer 300. The installed character recognition program 311 is stored in the HDD 330, read from the HDD 330 by the RAM 310, and executed by the CPU 320.

An output result (character recognition result) obtained by the character recognition program 311 is outputted as a tangible result, for example displayed on a display, printed by a printer, stored as data in a storage, or transmitted to another computer via a network.

The character recognition program 311 need not be stored in the HDD 330 as a computer readable storage medium. For example, the character recognition program 311 may be stored in a "portable physical medium" such as a flexible disk (FD), a compact disk read only memory (CD-ROM), a digital versatile disk (DVD), a magneto-optical disk, and an integrated circuit (IC) card that can be inserted into the computer 300. The computer 300 can read each computer program from the portable physical medium, and execute it by CPU 320.

According to the disclosed apparatus, it is possible to reduce the amount of the dictionary while achieving the recognition capability equivalent to that of the character recognition provided by using the probability distribution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A dictionary creating apparatus comprising:
   a feature-amount calculating unit that calculates amounts of feature of each category as a recognition item, based on training data for creating a pattern recognition dictionary;
   a distribution-profile calculating unit that calculates a distribution profile of a group of the amounts of feature of each category based on the amounts of feature of each category calculated by the feature-amount calculating unit;
   a distance calculating unit that calculates a distance between the distribution profiles of respective categories based on the distribution profile of the group of the amounts of feature of each category calculated by the distribution-profile calculating unit;
   a clustering-target determining unit that determines the distribution profiles as clustering targets based on the distance between the distribution profiles of respective categories calculated by the distance calculating unit;
   a typical-distribution-profile determining unit that determines a typical distribution profile that typifies the distribution profiles of the clustering targets determined by the clustering-target determining unit;
   a clustering unit that clusters the distribution profiles determined as the clustering targets by the clustering-target determining unit;
   an associating unit that associates the typical distribution profile determined by the typical-distribution-profile determining unit with the categories that are included as elements in the typical distribution profile after the clustering performed by the clustering unit; and
   a dictionary registering unit that resisters the typical distribution profile and the categories associated with each other by the associating unit, in a predetermined dictionary storage unit.

2. The dictionary creating apparatus according to claim 1, further comprising:
   a recognizing unit that performs recognition based on the distribution profile of the group of the amounts of feature of each category calculated by the distribution-profile calculating unit and testing sample data; and
   a combination extracting unit that extracts a combination of categories mutually having a recognition error rate higher than a predetermined threshold, from results of the recognition performed by the recognizing unit, wherein
   the clustering-target determining unit determines the distribution profiles as the clustering targets, with eliminating the combination of categories extracted by the combination extracting unit.

3. A recognizing apparatus comprising:
   a first dictionary storage unit that stores therein an average amount of feature and identification information of each category as a recognition item of pattern recognition, the average feature amount and the identification information being associated with each other;
a second dictionary storage unit that stores therein typical distribution profiles each typifying at least one distribution profile of a group of the average feature amounts of the categories, associated with the corresponding identification information;
a feature-amount extracting unit that extracts an amount of feature from input data as a recognition target;
a extracting unit that extracts the average feature amounts and the identification information corresponding to categories as distance calculation targets from the first dictionary storage unit, and extracts the typical distribution profile corresponding to each of the identification information from the second dictionary storage unit;
a distance calculating unit that calculates a distance between the amount of feature extracted from the input data by the feature-amount extracting unit and the average feature amount of each of the categories, using the typical distribution profile of the category extracted by the extracting unit; and
a recognizing unit that adopts a category having a shortest distance calculated by the distance calculating unit as a recognition result.

4. A recognizing method comprising:
extracting an amount of feature from input data as a recognition target;
extracting average feature amounts and identification information corresponding to categories as distance calculation targets from a first dictionary storage unit that stores therein the average feature amounts and identification information, associated with each other, of each category as a recognition item of pattern recognition;
extracting a typical distribution profile corresponding to each of the identification information from a second dictionary storage unit that stores therein the typical distribution profiles each typifying at least one distribution profile of a group of the average feature amounts of the categories, associated with the corresponding identification information;
calculating a distance between the amount of feature extracted from the input data at the extracting the feature amount and the average feature amount of each of the categories, using the typical distribution profile of the category extracted at the extracting the typical distribution profile; and
adopting a category having a shortest distance calculated at the calculating the distance as a recognition result.

5. A computer readable storage medium containing instructions that, when executed by a computer, causes the computer to execute a process comprising:
extracting an amount of feature from input data as a recognition target;
extracting average feature amounts and identification information corresponding to categories as distance calculation targets from a first dictionary storage unit that stores therein the average feature amounts and identification information, associated with each other, of each category as a recognition item of pattern recognition;
extracting a typical distribution profile corresponding to each of the identification information from a second dictionary storage unit that stores therein the typical distribution profiles each typifying at least one distribution profile of a group of the average feature amounts of the categories, associated with the corresponding identification information;
calculating a distance between the amount of feature extracted from the input data at the extracting the feature amount and the average feature amount of each of the categories, using the typical distribution profile of the category extracted at the extracting the typical distribution profile; and
adopting a category having a shortest distance calculated at the calculating the distance as a recognition result.

* * * * *